US012715765B2

(12) United States Patent
Kelly et al.

(10) Patent No.: US 12,715,765 B2
(45) Date of Patent: Aug. 25, 2026

(54) OXYGEN TRANSPORT MEMBRANE REACTORS FOR DECARBONIZATION

(71) Applicant: PRAXAIR TECHNOLOGY, INC., Danbury, CT (US)

(72) Inventors: Sean M. Kelly, Pittsford, NY (US); Sadashiv M. Swami, Williamsville, NY (US); Maulik R. Shelat, Macungie, PA (US); Ines C. Stuckert, Grand Island, NY (US); Steven M. Brown, Amherst, NY (US); Shrikar Chakravarti, East Amherst, NY (US); Juan Li, Clarence, NY (US); Digna Vora, Buffalo, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 1092 days.

(21) Appl. No.: 17/790,161

(22) PCT Filed: Dec. 18, 2020

(86) PCT No.: PCT/US2020/065834

§ 371 (c)(1),
(2) Date: Jun. 30, 2022

(87) PCT Pub. No.: WO2021/146024

PCT Pub. Date: Jul. 22, 2021

(65) Prior Publication Data

US 2023/0070799 A1 Mar. 9, 2023

Related U.S. Application Data

(60) Provisional application No. 62/960,408, filed on Jan. 13, 2020.

(51) Int. Cl.
*C01B 3/384* (2026.01)
*C01B 3/48* (2006.01)
*C01B 13/02* (2006.01)

(52) U.S. Cl.
CPC ................ *C01B 3/384* (2013.01); *C01B 3/48* (2013.01); *C01B 13/0251* (2013.01); *C01B 2203/0233* (2013.01); *C01B 2203/044* (2013.01)

(58) Field of Classification Search
CPC ....... C01B 3/384; C01B 3/48; C01B 13/0251; C01B 2203/0233; C01B 2203/044; C01B 2203/043; C01B 2203/86; Y02P 30/00
See application file for complete search history.

(56) References Cited

U.S. PATENT DOCUMENTS 2,593,507 A 4/1952 Wainer
2,692,760 A 10/1954 Flurschutz
(Continued)

FOREIGN PATENT DOCUMENTS

DE 3515681 A1 11/1986
DE 10330859 A1 2/2004
(Continued)

OTHER PUBLICATIONS

Switzer et al., "Cost and Feasibility Study on the Praxair Advanced Boiler for the CO2 Capture Project's Refinery Scenario", Carbon Dioxide Capture for Deep Geologic Formations, vol. 1, D.C. Thomas and S.M. Benson (Eds.), Copyright 2005 Published by Elsevier Ltd., Chapter 32, pp. 561-579.
(Continued)

*Primary Examiner* — Wayne A Langel
*Assistant Examiner* — Syed T Iqbal
(74) *Attorney, Agent, or Firm* — Ralph J. Mancini

(57) ABSTRACT

A method and system for decarbonization of a hydrocarbon conversion process such as steam methane reforming pro-
(Continued)

cess for hydrogen production utilizing oxygen transport membrane reactors. The system employs catalyst-containing reforming reactors for converting natural gas into synthesis gas which is further treated in high temperature or medium temperature water gas shift reactors and fed to a hydrogen PSA to produce hydrogen product. The system further employs oxygen transport membrane reactors thermally coupled to reforming reactors and configured to oxy-combust about 90% to about 95% of combustibles in PSA tail gas that may be optionally mixed with natural gas. The oxy-combustion product stream leaving the oxygen transport membrane reactors contains about 90% of the carbon provided to the feed of the reforming reactor. The carbon dioxide in the oxy-combustion product stream can be recovered and further purified for utilization or geologic storage or liquefied to form a liquid carbon dioxide product.

12 Claims, 7 Drawing Sheets

(56) References Cited

U.S. PATENT DOCUMENTS 3,282,803 A 11/1966 Poepel et al.
3,317,298 A 5/1967 Klomp et al.
3,770,621 A 11/1973 Collins et al.
3,861,723 A 1/1975 Kunz et al.
3,868,817 A 3/1975 Marion et al.
3,891,575 A 6/1975 Bräutigam et al.
3,930,814 A 1/1976 Gessner
3,976,451 A 8/1976 Blackmer et al.
4,013,592 A 3/1977 Matsuoka et al.
4,128,776 A 12/1978 Boquist et al.
4,153,426 A 5/1979 Wintrell
4,162,993 A 7/1979 Retalick
4,175,153 A 11/1979 Dobo et al.
4,183,539 A 1/1980 French et al.
4,206,803 A 6/1980 Finnemore et al.
4,261,167 A 4/1981 Paull et al.
4,292,209 A 9/1981 Marchant et al.
4,350,617 A 9/1982 Retalick et al.
4,357,025 A 11/1982 Eckart
4,365,021 A 12/1982 Pirooz
4,373,575 A 2/1983 Hayes
4,402,871 A 9/1983 Retalick
4,609,383 A 9/1986 Bonaventura et al.
4,631,238 A 12/1986 Ruka
4,631,915 A 12/1986 Frewer et al.
4,650,814 A 3/1987 Keller
4,651,809 A 3/1987 Gollnick et al.
4,720,969 A 1/1988 Jackman
4,734,273 A 3/1988 Haskell
4,749,632 A 6/1988 Flandermeyer et al.
4,783,085 A 11/1988 Wicks et al.
4,791,079 A 12/1988 Hazbun
4,862,949 A 9/1989 Bell, III
4,866,013 A 9/1989 Anseau et al.
5,021,137 A 6/1991 Joshi et al.
5,035,726 A 7/1991 Chen et al.
5,061,297 A 10/1991 Krasberg
5,143,751 A 9/1992 Richard et al.
5,169,506 A 12/1992 Michaels
5,169,811 A 12/1992 Cipollini et al.
5,171,646 A 12/1992 Rohr
5,185,301 A 2/1993 Li et al.
5,205,990 A 4/1993 Lawless
5,240,480 A 8/1993 Thorogood et al.
5,259,444 A 11/1993 Wilson
5,286,686 A 2/1994 Haig et al.
5,298,469 A 3/1994 Haig et al.
5,302,258 A 4/1994 Renlund et al.
5,302,355 A 4/1994 Fujikura et al.
5,306,411 A 4/1994 Mazanec et al.
5,342,705 A 8/1994 Minh et al.
5,356,730 A 10/1994 Minh et al.
5,417,101 A 5/1995 Weich
5,432,705 A 7/1995 Severt et al.
5,454,923 A 10/1995 Nachlas et al.
5,478,444 A 12/1995 Liu et al.
5,534,471 A 7/1996 Carolan et al.
5,547,494 A 8/1996 Prasad et al.
5,569,633 A 10/1996 Carolan et al.
5,599,509 A 2/1997 Toyao et al.
5,643,355 A 7/1997 Phillips et al.
5,649,517 A 7/1997 Poola et al.
5,707,911 A 1/1998 Rakhimov et al.
5,750,279 A 5/1998 Carolan et al.
5,804,155 A 9/1998 Farrauto et al.
5,820,654 A 10/1998 Gottzman et al.
5,820,655 A 10/1998 Gottzmann et al.
5,837,125 A 11/1998 Prasad et al.
5,855,762 A 1/1999 Phillips et al.
5,864,576 A 1/1999 Nakatani et al.
5,902,379 A 5/1999 Phillips et al.
5,927,103 A 7/1999 Howard
5,932,141 A 8/1999 Rostrop-Nielsen et al.
5,944,874 A 8/1999 Prasad et al.
5,964,922 A 10/1999 Keskar et al.
5,975,130 A 11/1999 Ligh et al.
5,980,840 A 11/1999 Kleefisch et al.
6,010,614 A 1/2000 Keskar et al.
6,035,662 A 3/2000 Howard et al.
6,048,472 A 4/2000 Nataraj et al.
6,051,125 A 4/2000 Pham et al.
6,070,471 A 6/2000 Westphal et al.
6,077,323 A 6/2000 Nataraj et al.
6,110,979 A 8/2000 Nataraj et al.
6,113,673 A 9/2000 Loutfy et al.
6,114,400 A 9/2000 Nataraj et al.
6,139,810 A 10/2000 Gottzmann et al.
6,153,163 A 11/2000 Prasad et al.
6,191,573 B1 2/2001 Noda
RE37,134 E 4/2001 Wilson
6,214,066 B1 4/2001 Nataraj et al.
6,214,314 B1 4/2001 Abbott
6,268,075 B1 7/2001 Autenrieth et al.
6,290,757 B1 9/2001 Lawless
6,293,084 B1 9/2001 Drnevich et al.
6,293,978 B2 9/2001 Kleefisch et al.
6,296,686 B1 10/2001 Prasad et al.
6,333,015 B1 12/2001 Lewis
6,352,624 B1 3/2002 Crome et al.
6,355,093 B1 3/2002 Schwartz et al.
6,360,524 B1 3/2002 Drnevich et al.
6,368,383 B1 4/2002 Virkar et al.
6,368,491 B1 4/2002 Cao et al.
6,382,958 B1 5/2002 Bool, III et al.
6,394,043 B1 5/2002 Bool, III et al.
6,402,156 B1 6/2002 Schutz et al.
6,402,988 B1 6/2002 Gottzmann et al.
6,430,966 B1 8/2002 Meinhardt et al.
6,468,328 B2 10/2002 Sircar et al.
6,475,657 B1 11/2002 Del-Gallo et al.
6,492,290 B1 12/2002 Dyer et al.
6,532,769 B1 3/2003 Meinhardt et al.
6,537,514 B1 3/2003 Prasad et al.
6,562,104 B2 5/2003 Bool, III et al.
6,592,731 B1 7/2003 Lawless
6,638,575 B1 10/2003 Chen et al.
6,641,626 B2 11/2003 Van Calcar et al.
6,652,626 B1 11/2003 Plee
6,681,589 B2 1/2004 Brudnicki
6,695,983 B2 2/2004 Prasad et al.
6,758,101 B2 7/2004 Valentine
6,783,750 B2 8/2004 Shah et al.
6,786,952 B1 9/2004 Risdal et al.
6,811,904 B2 11/2004 Gorte et al.
6,846,511 B2 1/2005 Visco et al.
6,916,570 B2 7/2005 Vaughey et al.
7,037,876 B2 5/2006 O'Brien et al.
7,077,133 B2 7/2006 Yagi et al.

(56) References Cited

U.S. PATENT DOCUMENTS 7,125,528 B2 10/2006 Besecker et al.
7,153,559 B2 12/2006 Ito et al.
7,179,323 B2 2/2007 Stein et al.
7,229,537 B2 6/2007 Chen et al.
7,261,751 B2 8/2007 Dutta et al.
7,279,244 B2 10/2007 Morishima et al.
7,320,778 B2 1/2008 Whittenberger
7,351,488 B2 4/2008 Visco et al.
7,374,601 B2 5/2008 Bonchonsky et al.
7,396,442 B2 7/2008 Bagby et al.
7,427,368 B2 9/2008 Drnevich
7,470,811 B2 12/2008 Thiebaut
7,510,594 B2 3/2009 Wynn et al.
7,534,519 B2 5/2009 Cable et al.
7,556,676 B2 7/2009 Nagabhushana et al.
7,588,626 B2 9/2009 Gopalan et al.
7,658,788 B2 2/2010 Holmes et al.
7,704,070 B2 4/2010 Veenstra
7,786,180 B2 8/2010 Fitzpatrick
7,833,314 B2 11/2010 Lane et al.
7,846,236 B2 12/2010 Del-Gallo et al.
7,856,829 B2 12/2010 Shah et al.
7,871,579 B2 1/2011 Tentarelli
7,901,837 B2 3/2011 Jacobson et al.
7,906,079 B2 3/2011 Whittenberger et al.
7,968,208 B2 6/2011 Hodgson
8,070,922 B2 12/2011 Nelson et al.
8,128,988 B2 3/2012 Yasumoto et al.
8,196,387 B2 6/2012 Shah et al.
8,201,852 B2 6/2012 Linhorst et al.
8,262,755 B2 9/2012 Repasky et al.
8,323,378 B2 12/2012 Swami et al.
8,323,463 B2 12/2012 Christie et al.
8,349,214 B1 1/2013 Kelly et al.
8,419,827 B2 4/2013 Repasky et al.
8,435,332 B2 5/2013 Christie et al.
8,455,382 B2 6/2013 Carolan et al.
8,658,328 B2 2/2014 Suda et al.
8,722,010 B1 5/2014 Grover
8,795,417 B2 8/2014 Christie et al.
8,894,944 B2 11/2014 Larsen et al.
9,023,245 B2 5/2015 Chakravarti et al.
9,115,045 B2 8/2015 Chakravarti et al.
9,212,113 B2 12/2015 Chakravarti et al.
9,296,671 B2 3/2016 Stuckert et al.
9,365,422 B2 6/2016 Chakravarti et al.
9,365,466 B2 6/2016 Chakravarti et al.
9,452,401 B2 9/2016 Kelly et al.
9,453,644 B2 9/2016 Kromer et al.
9,556,027 B2 1/2017 Chakravarti et al.
9,611,144 B2 4/2017 Chakravarti et al.
2002/0073938 A1 6/2002 Bool et al.
2002/0078906 A1 6/2002 Prasad et al.
2002/0141920 A1 10/2002 Alvin et al.
2002/0155061 A1 10/2002 Prasad et al.
2003/0039601 A1 2/2003 Halvorson et al.
2003/0039608 A1 2/2003 Shah et al.
2003/0054154 A1 3/2003 Chen et al.
2003/0068260 A1 4/2003 Wellington
2003/0230196 A1 12/2003 Kim
2004/0042944 A1 3/2004 Sehlin et al.
2004/0043272 A1 3/2004 Gorte
2004/0065541 A1 4/2004 Sehlin
2004/0089973 A1 5/2004 Hoang
2004/0135324 A1 7/2004 Brule et al.
2004/0221722 A1 11/2004 Prasad et al.
2005/0037299 A1 2/2005 Gottzmann
2005/0058871 A1 3/2005 Li et al.
2005/0061663 A1 3/2005 Chen et al.
2005/0137810 A1 6/2005 Esposito, Jr.
2005/0214612 A1 9/2005 Visco et al.
2005/0248098 A1 11/2005 Sisk et al.
2005/0263405 A1 12/2005 Jacobson et al.
2006/0019827 A1 1/2006 Whittenberger
2006/0029539 A1 2/2006 Dutta et al.
2006/0054301 A1 3/2006 McRay et al.
2006/0062707 A1 3/2006 Crome et al.
2006/0063659 A1 3/2006 Xue et al.
2006/0127656 A1 6/2006 Gallo et al.
2006/0127749 A1 6/2006 Christie et al.
2006/0191408 A1 8/2006 Gopalan et al.
2006/0236719 A1 10/2006 Lane et al.
2007/0004809 A1 1/2007 Lattner et al.
2007/0029342 A1 2/2007 Cross et al.
2007/0039466 A1 2/2007 Nawata et al.
2007/0041894 A1 2/2007 Drnevich
2007/0065687 A1 3/2007 Kelly et al.
2007/0082254 A1 4/2007 Hiwatashi
2007/0104793 A1 5/2007 Akash
2007/0122667 A1 5/2007 Kelley
2007/0137478 A1 6/2007 Stein et al.
2007/0158329 A1 7/2007 Cao
2007/0163889 A1 7/2007 Kato et al.
2007/0212271 A1 9/2007 Kennedy
2007/0245897 A1 10/2007 Besecker et al.
2007/0289215 A1 12/2007 Hemmings et al.
2007/0292342 A1 12/2007 Hemmings et al.
2007/0292742 A1 12/2007 Ball et al.
2008/0000350 A1 1/2008 Mundschau et al.
2008/0000353 A1 1/2008 Rarig et al.
2008/0006532 A1 1/2008 Mukundan et al.
2008/0023338 A1 1/2008 Stoots et al.
2008/0029388 A1 2/2008 Elangovan et al.
2008/0047431 A1 2/2008 Nagabhushana
2008/0141672 A1 6/2008 Shah et al.
2008/0142148 A1 6/2008 Nielsen et al.
2008/0168901 A1 7/2008 Carolan et al.
2008/0169449 A1 7/2008 Mundschau
2008/0226544 A1 9/2008 Nakamura
2008/0302013 A1 12/2008 Repasky et al.
2009/0001727 A1 1/2009 De Koeijer et al.
2009/0018373 A1 1/2009 Werth et al.
2009/0023050 A1 1/2009 Finnerty et al.
2009/0029040 A1 1/2009 Christie et al.
2009/0031895 A1 2/2009 Del-Gallo et al.
2009/0084035 A1 4/2009 Wei
2009/0107046 A1 4/2009 Leininger
2009/0120379 A1 5/2009 Bozzuto et al.
2009/0220837 A1 9/2009 Osada
2009/0272266 A1 11/2009 Werth et al.
2010/0015014 A1 1/2010 Gopalan et al.
2010/0018394 A1 1/2010 Ekiner et al.
2010/0074828 A1 3/2010 Singh
2010/0076280 A1 3/2010 Bernstein et al.
2010/0116133 A1 5/2010 Reed et al.
2010/0116680 A1 5/2010 Reed et al.
2010/0122552 A1 5/2010 Schwartz
2010/0143824 A1 6/2010 Tucker et al.
2010/0178219 A1 7/2010 Verykios et al.
2010/0178238 A1 7/2010 Takamura et al.
2010/0193104 A1 8/2010 Ryu et al.
2010/0200418 A1 8/2010 Licht
2010/0203238 A1 8/2010 Magno et al.
2010/0266466 A1 10/2010 Froehlich et al.
2010/0276119 A1 11/2010 Doty
2010/0313762 A1 12/2010 Roeck et al.
2011/0020192 A1 1/2011 Baumann et al.
2011/0067405 A1 3/2011 Armstrong et al.
2011/0070509 A1 3/2011 Mai
2011/0076213 A1 3/2011 Carolan et al.
2011/0111320 A1 5/2011 Suda et al.
2011/0120127 A1 5/2011 Lippmann et al.
2011/0132367 A1 6/2011 Patel
2011/0141672 A1 6/2011 Farley et al.
2011/0142722 A1 6/2011 Hemmings et al.
2011/0143255 A1 6/2011 Jain et al.
2011/0180399 A1 7/2011 Christie et al.
2011/0200520 A1 8/2011 Ramkumar
2011/0209618 A1 9/2011 Takahashi
2011/0240924 A1 10/2011 Repasky
2011/0253551 A1 10/2011 Lane et al.
2012/0000360 A1 1/2012 Richet et al.
2012/0067060 A1 3/2012 Greeff
2012/0067210 A1 3/2012 Sane et al.

(56) References Cited

U.S. PATENT DOCUMENTS

2012/0194783 A1 8/2012 Wei et al.
2012/0288439 A1 11/2012 Sundaram et al.
2013/0009100 A1 1/2013 Kelly et al.
2013/0009102 A1 1/2013 Kelly et al.
2013/0015405 A1 1/2013 Quintero
2013/0072374 A1 3/2013 Lane et al.
2013/0072375 A1 3/2013 Lane et al.
2013/0156958 A1 6/2013 Belov et al.
2013/0156978 A1 6/2013 Christie et al.
2013/0258000 A1 10/2013 Ohashi et al.
2014/0044604 A1 2/2014 Lane et al.
2014/0056774 A1 2/2014 Kelly et al.
2014/0060643 A1 3/2014 Martin et al.
2014/0183866 A1 7/2014 Kromer et al.
2014/0206779 A1 7/2014 Lackner
2014/0231351 A1 8/2014 Wickramasinghe et al.
2014/0242406 A1 8/2014 Kimura et al.
2014/0319424 A1 10/2014 Chakravarti et al.
2014/0319425 A1 10/2014 Chakravarti et al.
2014/0319426 A1 10/2014 Chakravarti et al.
2014/0319427 A1 10/2014 Chakravarti et al.
2014/0323597 A1 10/2014 Stuckert et al.
2014/0323598 A1 10/2014 Chakravarti et al.
2014/0323599 A1 10/2014 Chakravarti et al.
2015/0096506 A1 4/2015 Kelly et al.
2015/0098872 A1 4/2015 Kelly et al.
2015/0132485 A1 5/2015 Garing et al.
2015/0226118 A1 8/2015 Kelly et al.
2015/0328582 A1 11/2015 Joo et al.
2016/0001221 A1 1/2016 Lu et al.
2016/0118188 A1 4/2016 Wada
2016/0152469 A1* 6/2016 Chakravarti ............ B01J 8/067
422/162
2016/0155570 A1 6/2016 Shimada et al.
2016/0375411 A1 12/2016 Lin et al.

FOREIGN PATENT DOCUMENTS

DE 102004038435 A1 2/2006
EP 0 663 231 A2 7/1995
EP 0926096 A1 6/1999
EP 0984500 A2 3/2000
EP 0989093 A2 3/2000
EP 1 459 800 A2 9/2004
EP 1504811 A1 2/2005
EP 1717420 A1 11/2006
EP 1743694 A1 1/2007
EP 1930076 A1 6/2008
EP 2098491 A1 9/2009
EP 2873451 A1 5/2015
GB 688657 3/1953
GB 689522 4/1953
GB 697377 9/1953
GB 713553 11/1954
GB 1199483 7/1970
GB 1348375 3/1974
GB 2016298 A 9/1979
GB 2079174 1/1982
JP 56-136605 10/1981
JP 403060739 A 3/1991
JP 6277526 A 10/1994
JP 41000365 1/1998
JP 2001-520931 11/2001
JP 2003-534906 11/2003
WO WO 97/41060 11/1997
WO WO 9842636 10/1998
WO WO 0017418 3/2000
WO WO 0109059 A1 2/2001
WO WO 2004/063110 A2 7/2004
WO WO 2006/064160 A1 6/2006
WO WO 2007/021911 A2 2/2007
WO WO 2007/060141 5/2007
WO WO 2007/086949 8/2007
WO WO 2007/092844 A2 8/2007
WO WO 2008/024405 2/2008
WO WO 2009/027099 A1 3/2009
WO WO 2010/052641 A2 5/2010
WO WO 2011/020192 A1 2/2011
WO WO 2011/083333 A1 7/2011
WO WO 2011/121095 A2 10/2011
WO WO 2012/067505 A2 5/2012
WO WO 2012/118730 9/2012
WO WO 2013/009560 A1 1/2013
WO WO 2013/062413 A1 5/2013
WO WO 2013/089895 A1 6/2013
WO WO 2014/049119 A1 4/2014
WO WO 2014/072474 A1 5/2014
WO WO 2014/074559 A1 5/2014
WO WO 2014/077531 A1 5/2014
WO WO 2014/107707 A2 7/2014
WO WO 2014/160948 A1 10/2014
WO WO 2014/176022 A1 10/2014
WO WO 2015/034565 A1 3/2015
WO WO 2015/084729 A1 6/2015
WO WO 2015/160609 A1 10/2015
WO WO-2018169846 A1 * 9/2018 ........... B01D 53/047

OTHER PUBLICATIONS

David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010.

Zhu et al.; "Development of Interconnect Materials for Solid Oxide Fuel Cells"; Materials Science and Engineering A348, Apr. 23, 2002, pp. 227-243.

Lee Rosen et al.; "Development of Oxygen Transport Membranes for Coal-Based Power Generation"; ScienceDirect (Available online at www.sciencedirect.com); Energy Procedia 4 (2011) pp. 750-755.

F. Bidrawn et al., "Efficient Reduction of CO2 in a Solid Oxide Electrolyzer" Electrochemical and Solid State Letters, vol. 11, No. 9, Jun. 20, 2008, pp. B167-B170, XP002644615, col. 1, 2.

Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. JPOWSOUR. 2009. 02. 093.

The U.S. Department of Energy, "Evaluation of Fossil Fuel Power Plants with CO2 Recovery", Final Report (Feb. 2002).

The U.S. Department of Energy—Office of Fossil Energy and U.S. Department of Energy/NETL, "Evaluation of Innovative Fossil Fuel Power Plants with CO2 Removal", Interim Report (Dec. 2000).

Sylvain Deville; "Freeze-Casting of Porous Ceramics: A Review of Current Achievements and Issues"; Advanced Engineering Materials 2008, 10, No. 3, pp. 155-169.

Neville Holt, "Gasification Process Selection—Trade-offs and Ironies", Presented at the Gasification Technologies Conference 2004, Oct. 3-6, 2004 JW Marriott Hotel, Washington, DC, pp. 1-10.

Friedemann Marschner et al., "Gas Production", Ullmann's Encyclopedia of Industrial Chemistry, Jun. 15, 2000, pp. 1-21, XP002253967.

Dyer et al., "Ion Transport Membrane Technology for Oxygen Separation and Syngas Production", Solid State Ionics 134 (2000) p. 21-33.

Andrea Montebelli et al., "Methods for the catalytic activation of metallic structured substrates", Catalysis Science & Technology, 2014, pp. 2846-2870.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFSAM-TR-88-26; AD-A209 352; pp. 1-77; Jan. 1989.

Radtke et al., "Renaissance of Gasification based on Cutting Edge Technologies", VGB PowerTech (2005), XP-001235150, pp. 106-115.

L. N. Protasova et al., "Review of Patent Publications from 1990 to 2010 on Catalytic Coatings on Different Substrates, Including Microstructured Channels: Preparation, Deposition Techniques, Applications", Recent Patents on Chemical Engineering, 2012, pp. 28-44.

Zhimin Zhong, "Stoichiometric lanthanum chromite based ceramic interconnects with low sintering temperature", Solid State of Ionics,

(56) References Cited

OTHER PUBLICATIONS

North Holland Pub. Company, Amsterdam, NL, vol. 177 No. 7-8, Mar. 15, 2006, pp. 757-764, XP027895768,ISSN: 0167-2738.
Babcock & Wilcox, Steam 40, "Sulfur Dioxide Control" (1992), pp. 35-1-35-15.
M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.
Okawa et al., Trial Design for a CO2 Recovery Power Plant by Burning Pulverized Coal in O2/CO2 , Energy Convers. Mgmt., vol. 38, Supplement (1997) pp. S123-S127.
Ciacchi et al., "Tubular zirconia-yttria electrolyte membrane technology for oxygen separation", Solid State Ionics 152-153, 2002, pp. 763-768.
M. Solvang et al., "Optimization of Glass Ceramic Sealant for Intermediate Temperature Solid Oxide Fuel Cells", Jan. 1, 2005, XP055352985, Retrieved from the Internet: URL:http:/ma.ecsdl.org/content/MA2005-01/30/1206.full.pdf (retrieved on Mar. 8, 2017).
VDM Crofer et al., "Material Data Sheet No. 4046 May 2010 Edition", Jan. 1, 2010, XP055353076, Retrieved from the Internet: URL:http://www.vdm-metals.com/fileadmin/user_upload/Downloads/Data_Sheets/Data_Sheet_VDM_Crofer_22_APU.pdf retrieved on Mar. 9, 2017.
Yulia Hilli, et al.; "Sulfur adsorption and release properties of bimetallic Pd—Ni supported catalysts"; Journal of Molecular Catalysis A: Chemical, vol. 48, Jul. 28, 2015, pp. 161-171, XP029261263.
Magali Ferrandon, et al.; "Bimetallic Ni—Rh catalysts with low amounts of Rh for the steam and autothermal reforming of η-butane for fuel cell applications"; Applied Catalysis A: General, Elsevier, Amsterdam, NL, vol. 379, No. 1-2, May 15, 2010, pp. 121-128, XP027013168.
M. Boaro, et al.; "Comparison between Ni—Rh/gadolinia doped ceria catalysts in reforming of propane for anode implementations in intermediate solid oxide fuel cells"; Journal of Power Sources, Elsevier SA, CH, vol. 195, No. 2, Jan. 15, 2010, pp. 649-661, XP026640152.
Kanthal APM—Kanthal, Kanthal APM (Tube), http://www.kanthal.com/products/material-datasheet/tube/kanthal-apm/, pp. 1-5, Jan. 13, 2014.

* cited by examiner

200
AMBIENT AIR
FILTER
201
202
EXHAUST STACK
210
209
OXYGEN DEPLETED AIR
208
207
HX
203
AUX BURNER
205
NG+air
206
204
O2
232
FOx
223
222
224
221
Heat
SMR
212
NG+steam
211
213
WGS
214
PSA
215
Hydrogen
216
217
Tail gas
219
Steam
218
CO RX
220
225
227
PURIFIER
228
H2O
95%+ vol CO2
229
To liquefier (LCO2)
226
COMP
230
CO2
To Pipeline (CCS)
231

Fig. 4A

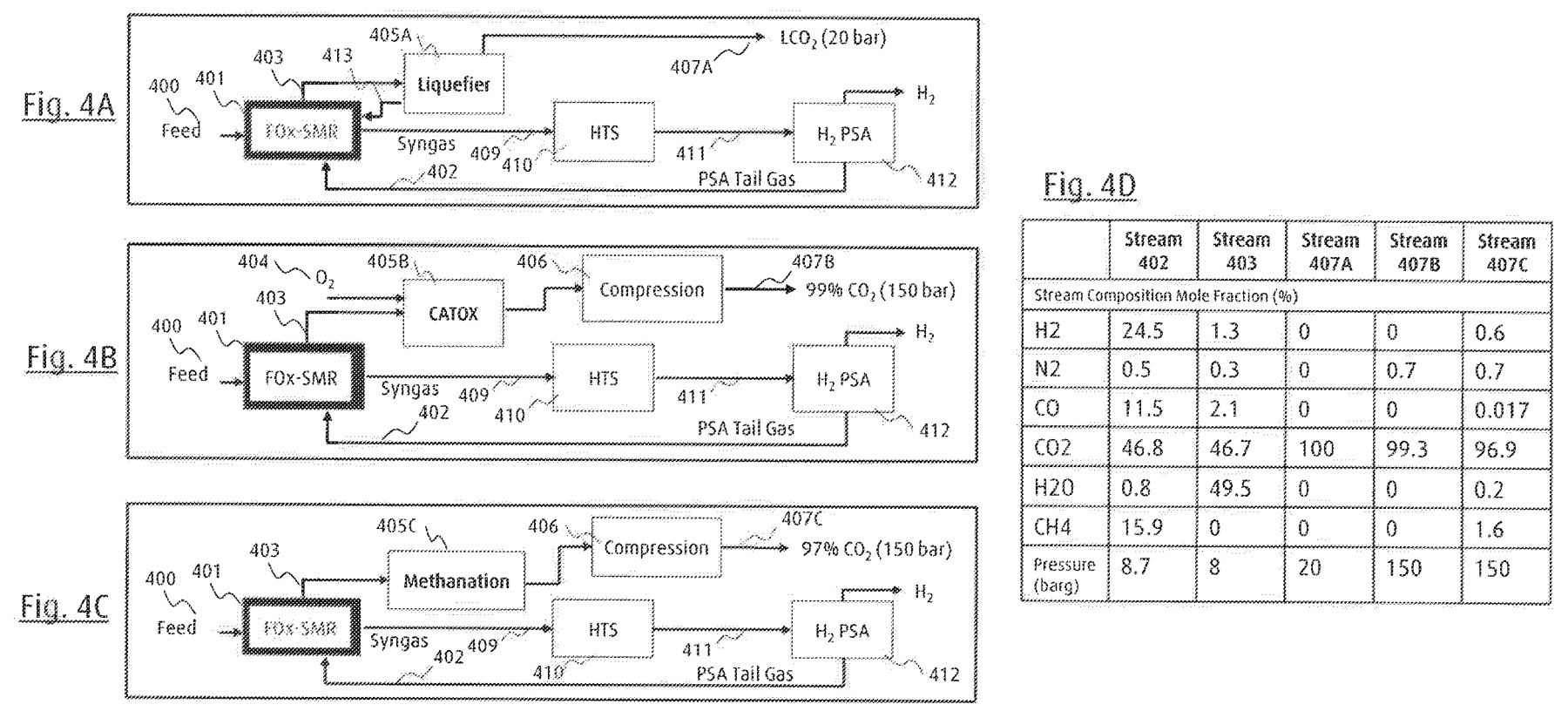

400 Feed 401 FOx-SMR 403 413 405A Liquefier 407A $LCO_2$ (20 bar) Syngas 402 409 410 HTS 411 $H_2$ PSA 412 $H_2$ PSA Tail Gas

Fig. 4B

400 Feed 401 FOx-SMR 403 404 $O_2$ 405B CATOX 406 Compression 407B 99% $CO_2$ (150 bar) Syngas 402 409 410 HTS 411 $H_2$ PSA 412 $H_2$ PSA Tail Gas

Fig. 4C

400 Feed 401 FOx-SMR 403 405C Methanation 406 Compression 407C 97% $CO_2$ (150 bar) Syngas 402 409 410 HTS 411 $H_2$ PSA 412 $H_2$ PSA Tail Gas

Fig. 4D

| | Stream 402 | Stream 403 | Stream 407A | Stream 407B | Stream 407C |
|---|---|---|---|---|---|
| Stream Composition Mole Fraction (%) | | | | | |
| H2 | 24.5 | 1.3 | 0 | 0 | 0.6 |
| N2 | 0.5 | 0.3 | 0 | 0.7 | 0.7 |
| CO | 11.5 | 2.1 | 0 | 0 | 0.017 |
| CO2 | 46.8 | 46.7 | 100 | 99.3 | 96.9 |
| H2O | 0.8 | 49.5 | 0 | 0 | 0.2 |
| CH4 | 15.9 | 0 | 0 | 0 | 1.6 |
| Pressure (barg) | 8.7 | 8 | 20 | 150 | 150 |

OXYGEN TRANSPORT MEMBRANE REACTORS FOR DECARBONIZATION

CROSS REFERENCE TO RELATED APPLICATIONS

This U.S. National Stage Under 35 USC 371 Application claims the benefit of International Application Serial Number PCT/US2020/065834 filed on Dec. 18, 2020 which claimed priority to and the benefit of U.S. Provisional Patent Application Ser. No. 62/960,408 filed on Jan. 13, 2020, the disclosure of which is incorporated by reference herein.

FIELD OF THE INVENTION

The present invention relates to a method and system for decarbonizing a hydrocarbon by utilizing an oxygen transport membrane-heated reforming system, water gas shift reactor, hydrogen PSA, and oxygen transport membrane reactor-based hydrogen PSA tail gas combustion system.

BACKGROUND OF THE INVENTION

Methane and other hydrocarbon containing feedstocks are widely used for production of hydrogen, chemicals and synthetic fuels. Steam methane reformers, commonly referred to as fired reformers, are a frequently used technology for hydrocarbon conversion, in which natural gas and steam are reformed in nickel catalyst-containing reformer tubes at high temperatures (e.g., 850° C. to 1000° C.) and moderate pressures (e.g., 16 to 30 bar) to produce a synthesis gas product. The endothermic heating requirements for steam methane reforming reactions occurring within the reformer tubes are provided by burners firing into the furnace that are fueled by part of the natural gas. In order to increase the hydrogen content of the synthesis gas produced by the steam methane reforming (SMR) process, the synthesis gas can be subjected to water-gas shift reactions to react steam with the carbon monoxide in the synthesis gas. Typically, hydrogen is recovered by treating the hydrogen rich stream in a $H_2$ PSA. The tail gas from the $H_2$ PSA is utilized as a fuel in the fired reformer to thermally manage endothermic reforming reactions. The carbon in the hydrocarbon feedstock that is in the PSA tail gas utilized as a fuel ends up as dilute carbon dioxide, generally discharged as part of the furnace flue gas.

Oxygen transport membrane-based reforming systems have been proposed as an alternative to conventional fired reformer systems. Examples of oxygen transport membrane-based reforming systems used in the production of synthesis gas can be found in U.S. Pat. Nos. 6,048,472; 6,110,979; 6,114,400; 6,296,686; 7,261,751; 8,262,755; 8,419,827; and 8,349,214. Compared to conventional steam methane reformers, these oxygen transport membrane reforming systems produce a synthesis gas containing lower amounts of hydrogen and higher amounts of carbon monoxide (lower hydrogen to carbon monoxide molar ratio); treating this synthesis gas in a hydrogen PSA results in a tail gas having more fuel value than can be directly utilized in the oxygen transport membrane-based reforming system.

International Application No. PCT/US2018/021961, filed on Mar. 12, 2018 which is incorporated herein by reference, now published as WO/2018/169846 relates to an improved process for high pressure synthesis gas and hydrogen production using a reactively-driven oxygen transport membrane-based system. Specifically, improvements include thermal coupling of the reforming reactor tubes with oxygen transport membrane reactor elements wherein the oxygen transport membrane reactor carries out oxidation of a fuel gas, containing PSA tail gas, optionally mixed with natural gas, with pure oxygen separated from air by the action of the membrane. In this configuration, the heat from the oxidation reactions on the oxygen transport membrane reactor surface provides the reaction heat for endothermic reforming reactions in the reforming reactor primarily via radiant heat transfer. The synthesis gas leaving the reforming reactor is further treated in a high temperature or medium temperature water gas shift reactor, and optionally in a low temperature shift reactor. No portion of the synthesis gas product stream from the reforming reactor is directly fed to the oxygen transport membrane reactor; therefore, the pressure of the synthesis gas product is not determined by the operating pressure of the oxygen transport membrane reactor. In this configuration, any unreacted or partially combusted fuel gas from the oxygen transport membrane reactors is supplied to a burner or vented into the furnace interior to complete the combustion with oxygen in ambient air. The resulting flue gas contains carbon dioxide mixed with air ingredients such as oxygen, nitrogen, and argon, as well as trace nitrogen-oxide byproducts of air combustion.

In the present invention, the PSA tail gas is oxy-combusted in the oxygen transport membrane reactors to achieve a totalized 90-95% conversion of combustibles such as hydrogen, carbon monoxide, and methane in the PSA tail gas. The resulting oxy-combustion product effluent from the oxygen transport membrane reactors can then be subjected to unit operations such as cooling, purification (water removal, PSA, and/or liquefaction process), and compression as required for carbon dioxide capture. In this "capture mode" the concentration of the raw stream leaving the OTM membranes is approximately 90-95% CO2 and comprises about 90% of the carbon in the feed of the steam methane reformer, for example in natural gas in the form of hydrocarbon(s). The raw stream leaving the OTM membranes comprises a concentrated CO2 stream suitable for downstream purification to form a CO2 co-product, a feed to a downstream process such as a dry reformer, or CO2 sequestering.

SUMMARY OF THE INVENTION

The present invention relates to a method and system for decarbonization of industrially important processes such as for production of hydrogen, liquid fuels, and chemicals. More particularly the invention utilizes oxygen transport membrane reactors to facilitate carbon capture in the industrially important hydrocarbon conversion process such as steam methane reforming for hydrogen production. The system of the invention comprises at least two reactors in the form of sets of catalyst-containing tubes:

- a first set of tubes comprising at least one catalyst-containing reforming reactor configured to convert a hydrocarbon feedstock such as natural gas by endothermic reforming reactions into a synthesis gas stream, and
- a second set of tubes comprising a reactively-driven and catalyst-containing oxygen transport membrane reactor configured to oxy-combust a fuel gas comprising PSA tail gas, and optionally mixed with natural gas and/or hydrogen, to generate and radiate heat to the reforming reactor; wherein the oxygen transport membrane reactors combust about 90% to about 95% of the combustibles in the said fuel gas, and the oxy-combustion products stream leaving the oxygen transport membrane reactors contains about 90% of the carbon provided to the feed of the steam methane reformer in the form of natural gas.

The method of the invention comprises:

separating oxygen from an oxygen containing stream with one or more oxidation catalyst-containing oxygen transport membrane reactors to produce an oxygen permeate and an oxygen-depleted retentate stream, the catalyst being contained within tubes on the permeate side of the oxygen transport membrane reactors;

feeding a fuel stream comprising PSA tail gas, optionally mixed with natural gas and/or hydrogen, to the permeate side of the oxygen transport membrane elements and reacting same with the oxygen permeate to generate a reaction products stream, oxy-combustion products stream, and heat;

transferring the heat via convection to the oxygen-depleted retentate stream and via radiation to said at least one catalyst-containing reforming reactor;

reforming a combined feed stream comprising natural gas and steam in said at least one reforming reactor in the presence of a reforming catalyst and radiant heat transferred from the oxygen transport membrane reactor to produce a reformed synthesis gas stream comprising hydrogen and carbon monoxide;

treating the synthesis gas product stream in a separate high, and/or medium, and/or low temperature shift reactor(s) to form a hydrogen-enriched synthesis gas stream;

recovering a hydrogen product stream and a tail gas stream from the hydrogen-enriched synthesis gas stream utilizing a hydrogen PSA. No portion of the synthesis gas product stream from the reforming reactor is fed directly to the reactively-driven and catalyst-containing oxygen transport membrane reactor, allowing for higher ratios of $H_2/CO$ in the syngas and for the reformers to be operated at higher pressures than that of the oxygen transport membrane-based reforming elements;

wherein the oxygen transport membrane reactors combust about 90% to about 95% of the combustibles in the fuel gas, and the oxy-combustion product stream leaving the oxygen transport membrane reactors contains about 90% of the carbon provided as natural gas to the reforming reactor.

The tail gas from hydrogen PSA, in one aspect can be compressed, mixed with superheated steam and subjected to water-gas shift reaction to provide a fuel stream containing less than 8% by volume CO to the oxygen transport membrane reactor. Alternately, the tail gas from hydrogen PSA can be compressed, mixed with superheated steam and subjected to methanation reaction to provide a fuel stream containing less than 8% by volume CO to the oxygen transport membrane reactor.

The tail gas from hydrogen PSA, in another aspect can be compressed, mixed with superheated steam and subjected to water-gas shift reaction or methanation reaction to provide a fuel stream to the oxygen transport membrane reactor wherein the fuel stream chemical equilibrium carbon activity calculated at a temperature of about 500° C. and a pressure of about 9 barg has a value less than about 10, preferably the fuel stream chemical equilibrium carbon activity calculated at a temperature of about 600° C. and a pressure of about 9 barg has a value less than about 5, more preferably the fuel stream chemical equilibrium carbon activity calculated at a temperature of about 600° C. and a pressure of about 9 barg has a value less than about 2.

The oxy-combustion product stream leaving the oxygen transport membrane reactor, a concentrated CO2 stream, in one aspect can be further processed to produce a CO2 product of at least 99.5% CO2 by volume by a cryogenic liquefaction process. The non-condensable gases rejected from the cryogenic process can be recycled back to the feed of the reformer system. In another aspect, tyre concentrated CO2 stream can be further processed in a PSA process or a TSA process or a catalytic oxidation process or a methanation process or combinations of one or more of these processes to produce a higher purity CO2 for sequestration or use as a feedstock to a downstream process such as dry-reforming process, a methanol synthesis process, a Fisher-Tropsch synthesis process, a cement-curing or cement production process. The catalytic oxidation process can be supplied with a supplemental oxygen containing stream to produce a higher purity super-critical CO2 product, for example at least 99% CO2 by volume. The methanation process can be configured to produce a moderate purity super-critical CO2 product, for example at least 95% CO2 by volume, CO in a concentration of less than 1000 ppm by volume, and total hydrocarbons in a concentration less than 5% by volume.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

FIG. 4 is a simplified schematic illustration and comparison of three embodiments of a process to further concentrate CO2 from a ceramic membrane flameless oxidizer

DETAILED DESCRIPTION

Figure 1:
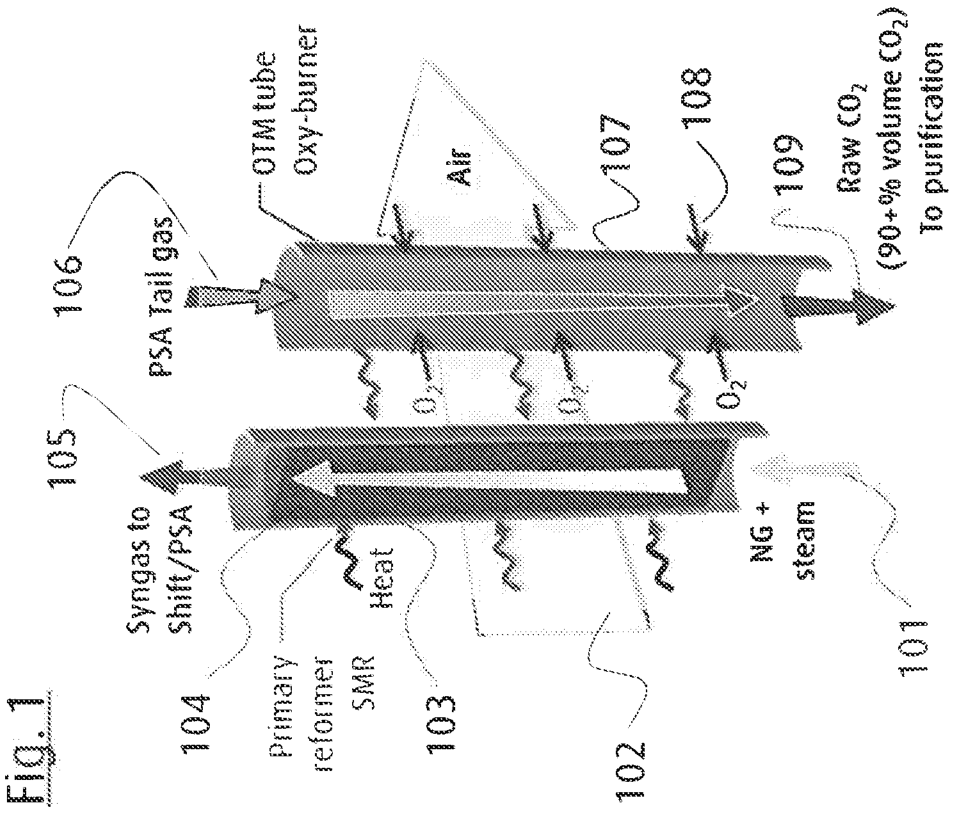
FIG. 1 is a schematic illustration of an embodiment for using an oxygen transport membrane as a flameless oxidizer to provide heat to a natural gas conversion process while producing a concentrated and contained carbon dioxide stream.

The present invention relates to a method and system for decarbonization of industrially important processes such as for production of hydrogen, liquid fuels, and chemicals. More particularly the invention utilizes oxygen transport membrane reactors to facilitate carbon capture in the industrially important hydrocarbon conversion process such as steam methane reforming for hydrogen production. The system of the invention comprises at least two reactors in the form of sets of catalyst-containing tubes:

a first set of tubes comprising at least one reforming catalyst-containing reforming reactor configured to convert a hydrocarbon feedstock such as natural gas by endothermic reforming reactions into a synthesis gas stream, and a second set of tubes comprising a reactively-driven and catalyst-containing oxygen transport membrane reactor configured to oxy-combust a fuel gas comprising PSA tail gas, optionally mixed with natural gas, to generate and radiate heat to the reforming reactor; wherein the oxygen transport membrane reactors combust about 90% to about 95% of the combustibles in the fuel gas, and the oxy-combustion products stream leaving the oxygen transport membrane reactors contains about 90% of the carbon provided as natural gas to the reforming reactor.

The method of the invention comprises:

separating oxygen from an oxygen containing stream with one or more oxidation catalyst-containing oxygen transport membrane reactors to produce an oxygen permeate and an oxygen-depleted retentate stream, the catalyst being contained within tubes on the permeate side of the oxygen transport membrane reactors;

feeding a PSA tail gas optionally mixed with natural gas, fuel gas stream to a permeate side of the oxygen transport membrane elements and reacting same with the oxygen permeate to generate a reaction products stream, oxy-combustion products stream and heat;

transferring the heat via convection to the oxygen-depleted retentate stream and via radiation to said at least one catalyst-containing reforming reactor;

reforming a combined teed stream comprising natural gas and steam in said at least one reforming reactor in the presence of a reforming catalyst and radiant heat transferred from the oxygen transport membrane reactor to produce a reformed synthesis gas stream comprising hydrogen and carbon monoxide;

treating the synthesis gas product stream in a separate high, medium and/or low temperature shift reactors to form a hydrogen-enriched synthesis gas stream;

recovering a hydrogen product stream and a tail gas stream from the hydrogen-enriched synthesis gas stream utilizing a hydrogen PSA. No portion of the synthesis gas product stream from the reforming reactor is fed to the reactively-driven and catalyst-containing oxygen transport membrane reactor, allowing for higher ratios of $H_2/CO$ in the syngas and for the reformers to be operated at higher pressures than that of the oxygen transport membrane-based reforming elements;

wherein the oxygen transport membrane reactors combust about 90% to about 95% of the combustibles in the fuel gas, and oxy-combustion product stream leaving the oxygen transport membrane reactors contains about 90% of the carbon provided to the feed of the reforming reactor.

In one embodiment, at least a portion of the fuel gas stream required for the oxygen transport membrane reactor is the tail gas stream from the hydrogen PSA, mixed with supplementary light hydrocarbon fuel such as natural gas. The heat generated as a result of the reaction of the fuel gas stream with permeated oxygen in the reactively-driven and catalyst-containing oxygen transport membrane reactor is transferred: (i) to the reforming reactor; (ii) to the unreformed fuel gas stream present in the reactively-driven, catalyst-containing oxygen transport membrane reactor; and (iii) to an oxygen-depleted retentate stream. The oxygen transport membrane reactor can be configured to utilize all or a portion of the tail gas or a light hydrocarbon containing gas or mixtures thereof. Natural gas or any methane rich gas can be used as a source of the hydrocarbon containing feed stream.

A distinctive feature of the oxygen transport membrane reactor method and system is oxy-combustion of fuel gas wherein the oxygen transport membrane reactors combust about 90% to about 95% of the combustibles in the fuel gas, and the oxy-combustion products stream leaving the oxygen transport membrane reactors contain about 90% of the carbon contained in the natural gas provided to the reforming reactor.

The invention may also be characterized as an oxygen transport membrane-based decarbonization method and system for converting hydrocarbon feedstocks into industrially important products such as hydrogen, synthesis gas, liquid fuels, chemicals and similar applications. The hydrocarbon feedstock such as natural gas is fed to a steam methane reformer wherein the natural gas is converted into a syngas. The syngas is further processed to produce a hydrogen product and a tail gas fuel stream. The tail gas fuel stream derived from syngas is combusted one or more oxygen transport membrane reactors producing reaction heat and a combustion product stream. A portion of the heat required to sustain the endothermic reforming reaction in the reformer is provided by the oxygen transport membrane generated reaction heat via radiant heat transfer. The combustion product stream exiting the oxygen transport membrane reactor is processed to produce a concentrated CO2 stream containing from about 90% CO2 by volume to about 95% CO2 by volume.

FIG. 1 provides a schematic illustration of use of oxygen transport membranes, as a flameless oxidizer for decarbonization of an industrially important natural gas conversion process for producing hydrogen. A feed of natural gas and superheated steam, 101, is fed to one or more steam methane reformer tubes, 103, and reacted in the presence of internal catalyst 104. Heat for reforming reactions in the steam methane reformer tubes is provided from oxygen transport membrane tubes. OTM tubes, 107, to create a syngas, 105, which is then cooled, shifted, and sent to a PSA to create a first hydrogen product stream. Heated low pressure tail gas effluent from the PSA process, 106, is provided to one or more oxygen transport membrane (OTM) tubes, 107, and reacted with pure oxygen, separated from heated air stream, 102, and transported across the ceramic membrane, 108, to produce a raw stream, 109, where approximately 90-95% of the totalized molecular hydrogen, CO, and methane contained in the PSA tail has been oxidized to produce a stream containing approximately 90-95% CO2 by volume on dry basis.

Figure 2:
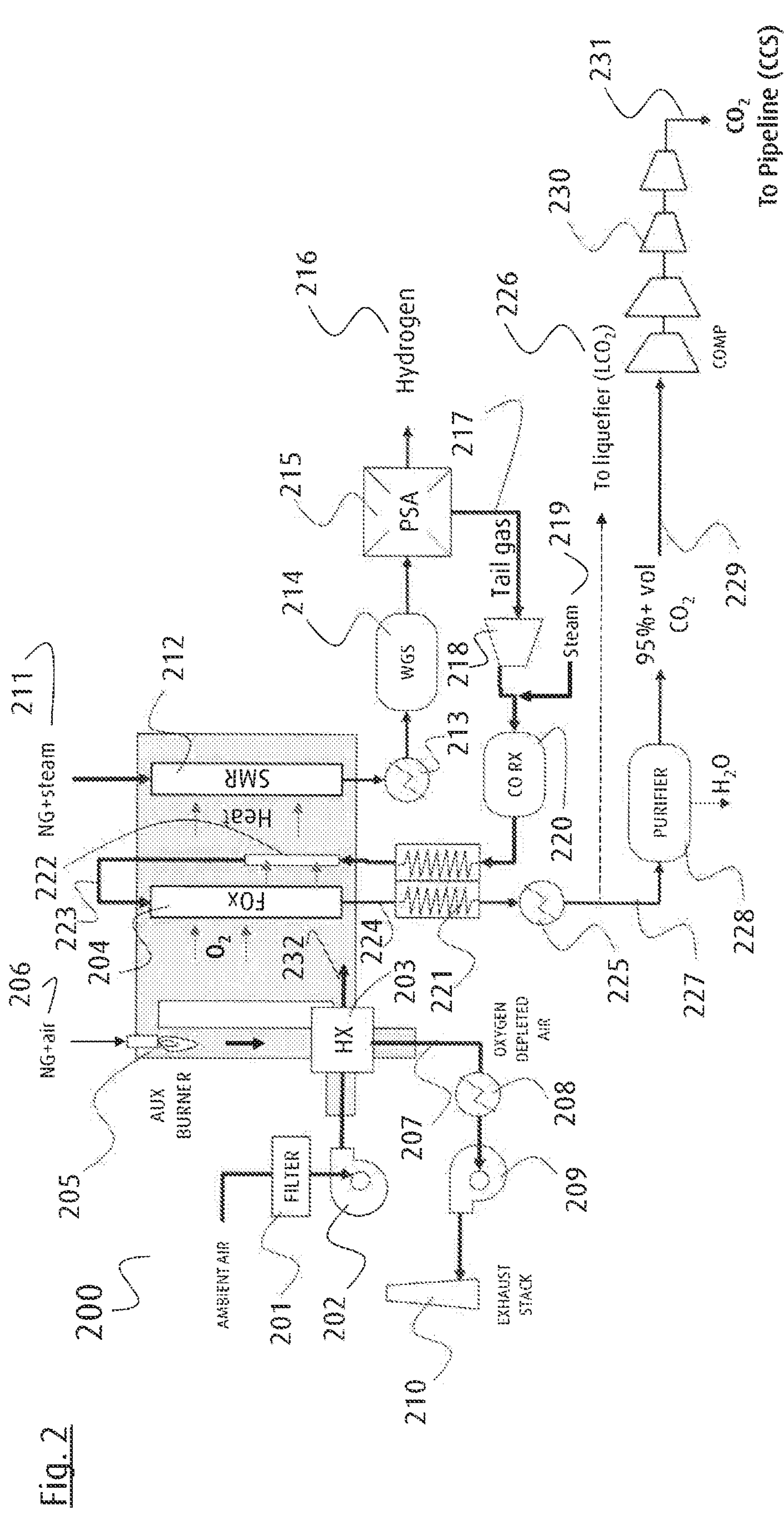
FIG. 2 is a simplified schematic illustration of an embodiment of a process design for converting natural gas into hydrogen product, and creating a stream with highly concentrated CO2 for liquefaction, or purification, compression, and storage.

Referencing the schematic in FIG. 2, a reactor system, 200, comprising one or more arrays of steam methane reformer tubes, 212, and one or more arrays, 204 of oxygen transport membrane tubes, flameless oxidizer (FOx) tubes, that operate as a hydrogen production system additionally creating a stream with highly concentrated CO2 for liquefaction, or purification, compression, and storage. In the depicted process embodiment, a mixed-feed of preheated and desulfurized natural gas, and superheated steam in a ratio of approximately 2 to 5 moles of steam per mole of natural gas, 211, is supplied to one or more catalyst-filled reformer tubes, 212, arranged in a furnace enclosure in radiation heat exchange with ceramic membrane flameless oxidizers, 204, and convective heat exchange with surrounding air within the enclosure. Approximately 75%-85% of methane in mixed-feed is converted to hydrogen and CO, forming a reformed synthesis gas, also referred to as syngas. The syngas is cooled by generating steam in process gas boiler (PGB), 213, and then further reacted in a water-gas shift (WGS) reactor, 214, to further convert some of the carbon monoxide and steam to carbon dioxide and hydrogen. A high purity product hydrogen stream is separated at high pressure in a pressure swing adsorption (PSA) unit, 215, and the residual gases are removed as a tail gas stream, 217, at low pressure. The PSA tail gas stream, 217, is compressed to approximately 7-9 bang in compressor 218. Superheated steam, 219, is added to the high-pressure compressor discharge, approximately 20%-50% of the final mixed volume and fed to reactor, 220. The reactor 220, preferably a water-gas shift (WGS) reactor, or alternately a methanation reactor, facilitates reactions, in the presence of the appropriate commercially available catalysts to reduce the carbon monoxide concentration. The desired CO concentration leaving the reactor is less than 8% by volume. The CO-adjusted, flameless oxidizer fuel stream is subsequently preheated in heat exchanger, 221, against hot ceramic membrane nameless oxidizer exhaust, 224, and further heated in one or more tubular elements, 222, positioned inside the furnace and radiatively heated by the flameless oxidizers, 204. The nameless oxidizer fuel stream. 223, is oxidized approximately 90-95% in nameless oxidizer array, 204, producing oxy-combustion product stream, 224, further cooled by heat exchanger, 221, and process gas cooler heat exchanger, 225. The raw oxy-combustion stream comprising CO2 and residual hydrogen, moisture, CO, and nitrogen carryover from the natural gas feed may be fed to a downstream liquefaction process, 226, to produce liquid CO2 co-product, or further purified with reactions of the impurities in reactor 228, to produce a high CO2 concentration stream, 229, which may be further dried and compressed in compressor train, 230, and subsequently provided to a pipeline as a super-critical fluid, 231, suitable for permanent geological storage. Oxygen for the nameless oxidizer elements is provided from ambient air filtered in particulate filter, 201, pressurized with forced-draft blower, 202, and preheated in heat exchanger, 203, against depleted air leaving the furnace, and further heated by auxiliary burner, 205, supplied with auxiliary fuel and air, 206. The oxygen-depleted furnace air, typically with oxygen concentration 8-10% by volume, is further heated with auxiliary burner, 205, and cooled with heat exchanger, 203, and process gas cooler heat exchanger, 208. Further draw from the furnace is provided by induced-draft blower, 209, with exhaust to stack. 210.

Figure 3:
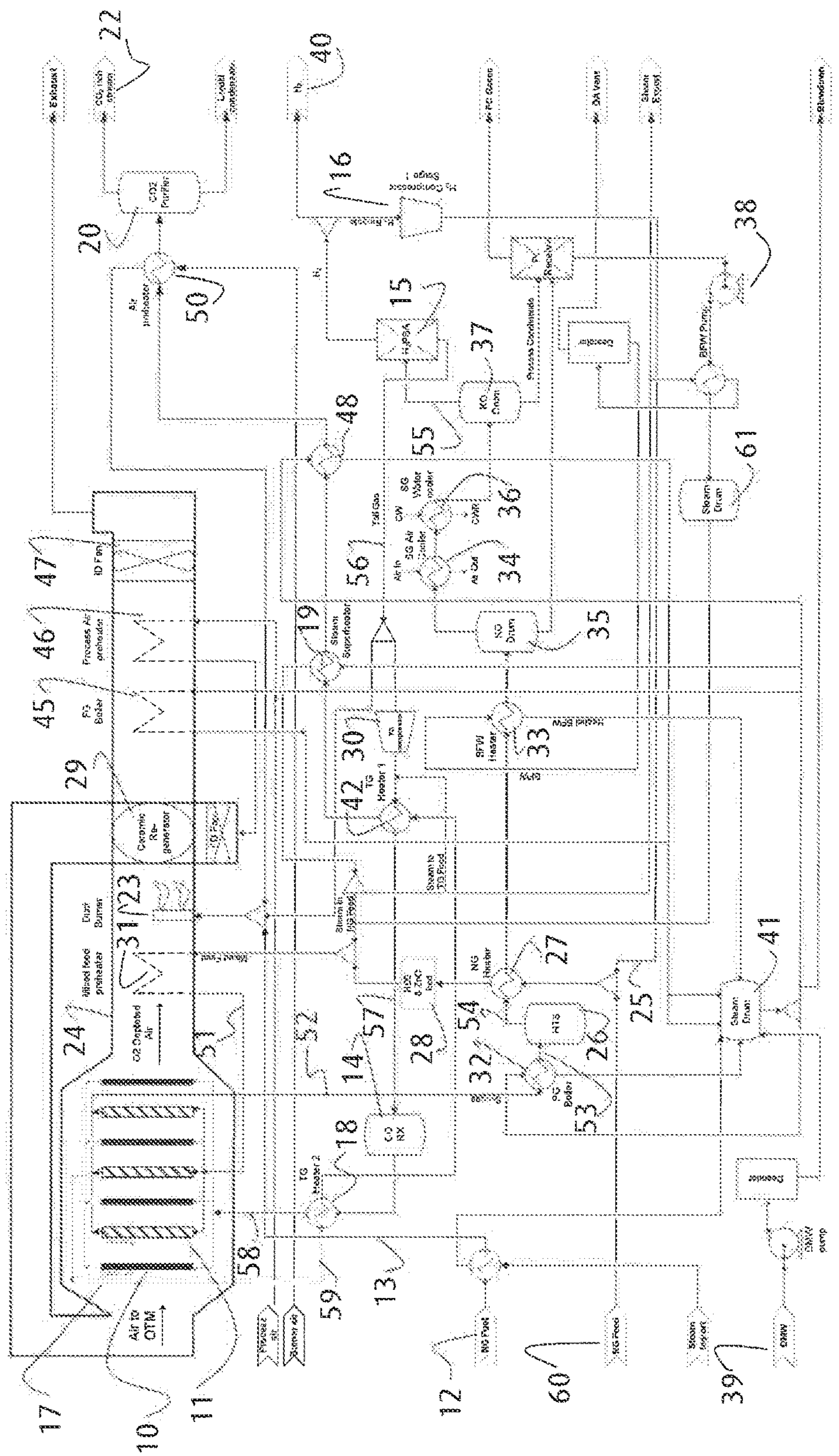
FIG. 3 is a detailed schematic illustration of an embodiment of a process design for converting natural gas into hydrogen product, and creating a stream with highly concentrated CO2 for liquefaction, or purification, compression, and storage.

FIG. 3. is a more detailed schematic of hydrogen production system shown in FIG. 2, Referencing the schematic in FIG. 3, a steam-methane reformer based hydrogen production system, 24, comprising one or more arrays of steam methane reformer tubes, 11, and one or more arrays of oxygen transport membrane flameless oxidizer tubes, 10, operate as a hydrogen production system with a concentrated CO2 stream co-product. A natural gas feed stream, 60, is mixed with a small portion of hydrogen product stream, 25, and sent to a natural gas heater, 27, and desulfurized in hydro-desulfurizer bed, 28, containing ZnO. The heated and desulfurized natural gas stream is mixed with saturated steam from steam drum, 61, and preheated in feed heater coil, 31, oriented in the heated process air stream. The heated mixed feed is supplied to one or more arrays of steam methane reformer, 11, heated by OTM flameless oxidizer tubes, 10, in furnace enclosure, 24 to produce a syngas. The syngas is cooled in water-filled process gas boiler, 32, and water-gas shifted in reactor, 26. The shifted syngas is cooled in natural gas heater 27, and boiler feedwater heater, 33. Process condensate is separated in knock-out drum, 35, and the remaining syngas is further cooled in heat exchangers, 34 and 36. Additional water is removed in knock-out drum, 37, and the remaining cooled syngas is provided to hydrogen pressure swing adsorption system (PSA), 15, to form a first hydrogen product, 40. The low pressure PSA tail gas, is compressed in compressor, 30, preheated in heat exchanger, 42, and fed to a reactor, 14, to reduce CO content with a water-gas shift reaction, or alternatively a methanation reaction. The CO-adjusted gas is further preheated in heat exchanger, 18, and subsequently provided to the OTM flameless oxidizer elements, 10. The predominately oxy-combusted PSA tail gas leaving OTM tubes, 17, is cooled in heat exchanger, 18, and further cooled in heat exchanger, 42, steam superheater, 19, heat exchanger, 48, and air preheater heat exchanger, 50. The raw CO2 stream is further concentrated in purifier, 20, producing a process condensate stream, and a concentrated CO2 stream, 22.

Referencing FIGS. 4A, 4B, and 4C, three different process configurations for CO2 purification is depicted, Common to FIGS. 4A, 4B, and 4C, is a mixed-feed of natural gas and steam, 400, feeding an oxygen transport membrane, flameless oxidizer-fired steam-methane reformer furnace, 401, producing a syngas stream, 409, and a raw oxy-combustion product stream comprising CO2, 403, The syngas stream, 409, is water-gas shifted in reactor, 410, to produce stream, 411, with a high concentration of hydrogen and CO2. A pressure-swing adsorption system (PSA), 412, separates high-purity hydrogen product from the residual gas forming PSA tail gas stream, 402, which is subsequently heated and provided to the flameless oxidizer elements in SMR, 401, producing a raw oxy-combustion product stream comprising CO2, 403. In FIG. 4A, a further purification of stream 403 is implemented with a liquefaction process, 405A, producing a liquid CO2 co-product, 407A of 99.9% or higher purity. The non-condensable gases rejected from the cryogenic process, 413, can optionally be recycled back to the feed of the reformer system. In FIG. 4B, a further purification of stream 403 is implemented by a catalytic oxidation process (CATOX) 405B, with supplied oxygen, 404, to produce a concentrated CO2 stream which can be subsequently compressed with compressor train, 406, to produce super-critical CO2 product, 407B having 99.3% or higher purity. In FIG. 4C, a further purification of stream 403 is implemented by a methanation reaction process followed by a dryer, 405C, to produce a concentrated CO2 stream which can be subsequently compressed with compressor train, 406, to produce a moderate purity super-critical CO2 product, 407C such as containing 96% or higher CO2 concentration by volume; CO in a concentration less than 1000 ppm by volume, total hydrocarbons in a concentration less than 5% by volume, preferably less than 4% by volume. Typical stream compositions are shown in FIG. 4D. From the figure, one can see that the highest purity is attained with liquefaction process producing stream 407A. The CATOX process, 405B, produces then the next highest CO2 purity, at generally a lower energy and capital cost than the liquefier option. The methanation process, 405C, produces stream 407C that has a lower purity than 407B, but also at a significantly lower cost than CATOX process, 405B. The purification process will generally be chosen based upon the purity requirements for the CO2.

Figure 5:
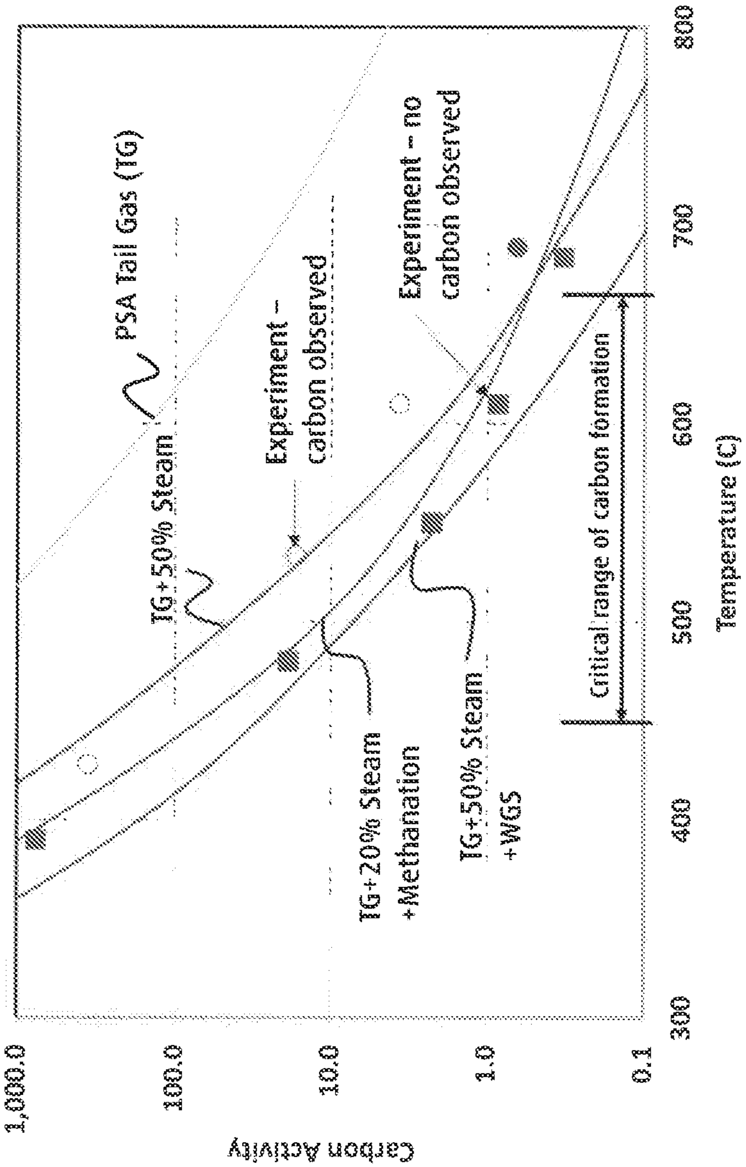
FIG. 5 depicts the relative thermodynamic chemical equilibrium solid carbon activities across a critical temperature range for several ceramic membrane flameless oxidizer fuel gas compositions.

FIG. 5 depicts the relative equilibrium solid carbon activities across a critical temperature range for several ceramic membrane flameless oxidizer fuel gas compositions. For the hydrogen production process as described in FIG. 2, or FIG. 3, the PSA tail gas is reheated in one or more heat exchangers and presented to the ceramic membrane nameless oxidizers as a fuel, ultimately to be combusted in the presence of permeated oxygen, releasing heat to drive the steam-methane reforming of the natural gas and steam feed. The PSA tail gas generally comprises a mixture of residual CO, CO2, and methane and during the reheating process, may undergo one or more carbon formation reactions:

CO+H2→C(s)+H2O CO reduction[−131kJ/mol]

2CO→C(s)+CO2Boudouard[−172kJ/mol]

CH4→C(s)+H2Methane Pyrolysis[+75kJ/mol]

From Le Chatelier's principle, the methane pyrolysis reaction is endothermic and favored at high temperatures. The CO reduction and Boudouard reactions are exothermic and are favored at reduced temperatures, but not so low as that the reaction kinetics rates are suppressed, and also favored at higher pressure since the reaction produces less moles of gaseous products. For the heating of PSA tail gas, the CO reduction and Boudouard reactions are generally problematic for heating in the 450-650 C temperature range. The reverse CO reduction and Boudouard reactions are favored in the presence of increased product concentration, CO2 and steam, and reduced reactant concentration, primarily CO. FIG. 8, depicts carbon formation mitigation strategy across the critical temperature range. The chart shows thermodynamic chemical equilibrium carbon activity across a range of temperature for several feed compositions to the ceramic membrane flameless oxidizers.

The carbon activity expressions for the three carbon formation reactions are listed in Table 1. The equilibrium constants as function of temperature for each of the reactions—$K_1$, $K_2$, $K_3$— are calculated first using thermodynamic properties. The carbon activities—$ac_1$, $ac_2$, $ac_3$—are then computed using equilibrium constants and partial pressures of the reactants and products according to the reference "Fundamental of Mass Transfer in Gas Carburizing [Olga Karabelchtchikova, Ph.D. Dissertation, November 2007]". The maximum carbon activity of three reactions is considered for selecting suitable tail gas composition for FOx elements. The tail gas feed composition is adjusted either by addition of steam, addition of steam followed by water gas shift reaction or addition of steam followed by methanation reaction such that maximum carbon activity at 600° C. approaches to one. The 600° C. temperature is chosen as design condition since it is reported in the literature as kinetically favorable temperature at which reaction rates of carbon formation reactions are at peak levels.

TABLE 1

| Carbon Formation Reactions Reaction | Activity equation | Equilibrium constant |
|---|---|---|
| 1) CO reduction | $ac_1 = K_1 \frac{p_{CO} p_{H2}}{p_{H2O}}$ | $K_1 = e^{\left(\frac{16333.11}{T} - 17.26\right)}$ |
| 2) Boudouard | $ac_2 = K_2 \frac{(p_{CO})^2}{p_{CO2}}$ | $K_2 = e^{\left(\frac{20530.65}{T} - 20.98\right)}$ |
| 3) Methane pyrolysis | $ac_3 = K_3 \frac{p_{CH4}}{(p_{H2})^2}$ | $K_3 = e^{\left(\frac{10949.68}{T} - 13.31\right)}$ |

Carbon activity of various gas composition was also investigated in laboratory experiments by flowing a gas mixture comprising hydrogen, carbon monoxide, carbon dioxide, steam, and methane, through a ceramic tubular shell heated with three electrical tube furnaces with heating zones evenly distributed along its length with setpoints at 300° C., 500° C., and 700° C. Several 800HT metal alloy sheet metal coupons were distributed along the gas flow path from inlet to outlet to serve as substrates for carbon deposition. Temperature measurements from thermocouples were obtained at the location of each sample. The experiments confirmed the deposition of carbon at significant rates for exposures less than 100 hours in the temperature range of 430° C. to 650° C. By conducting tests with gas compositions across a range of thermodynamic carbon activities and evaluating carbon deposition rates on the metal coupon samples, it was determined that a carbon activity of less than 10 is desirable for metal temperatures above 500° C., and the process should be configured to achieve the lowest practical carbon activity in the range of 500° C. to 600° C., FIG. 5 plots the results of chemical equilibrium calculations for carbon forming reactions listed in Table 1 for FIG. 4D gas compositions. The PSA tail gas, stream 402 will have a severe high carbon activity across the temperature range of interest. Steam may be added to the PSA tail gas mixture leading to a marked improvement in carbon activity, however experiments indicate that carbon precipitate will be observed within the temperature range of interest consistent with the thermodynamic carbon activity. The carbon activity can be further reduced by reducing the concentration of CO in the feed gas. This can be achieved with either the well-known water-gas shift reaction, or methanation reaction. The benefits of each approach are shown in the figure and each produce a reduced carbon activity in the target range that is consistent with experiments showing no carbon precipitation. Further reductions in rates can be achieved by reducing gas pressure. For this reason, the compression of the PSA tail gas is to be limited to below 9 barg, and preferably as low as practical to overcome system pressure drop and achieve target oxygen flux permeation rates in the ceramic membrane nameless oxidizers. A summary of gas stream compositions and reference carbon activities at 500° C. and 600° C. and target pressure of 9 barg is shown in Table 2. The carbon activity in the temperature range of interest is dominated by the Boudouard and the CO reduction carbon-forming reactions, and are very sensitive to the concentration of CO. In general, a CO concentration of less than 8% by volume is desirable, and preferably the process should be configured to reduce the concentration of CO to a minimum.

TABLE 2

| Carbon Activity Calculation Results | | | | |
|---|---|---|---|---|
| | Dry PSA Tail Gas (TG) | TG + 50% steam addition | TG + 20% steam with methanation | TG + 50% steam with water-gas shift (WGS) |
| $H_2$ Mole % | 24.5% | 16.3% | 9.4% | 21.8% |
| $N_2$ | 0.5% | 0.4% | 0.5% | 0.4% |
| CO | 11.5% | 7.7% | 4.5% | 2.2% |
| $CO_2$ | 46.8% | 31.2% | 43.9% | 36.6% |
| $H_2O$ | 0.8% | 33.9% | 22.5% | 28.4% |
| CH4 | 15.9% | 10.6% | 19.2% | 10.6% |
| Carbon activity at 500° C.; 9 barg | 1439 | 48.2 | 11.7 | 7.8 |
| Carbon activity at 600° C.; 9 barg | 128 | 2.3 | 1.1 | 0.69 |

Figure 6:
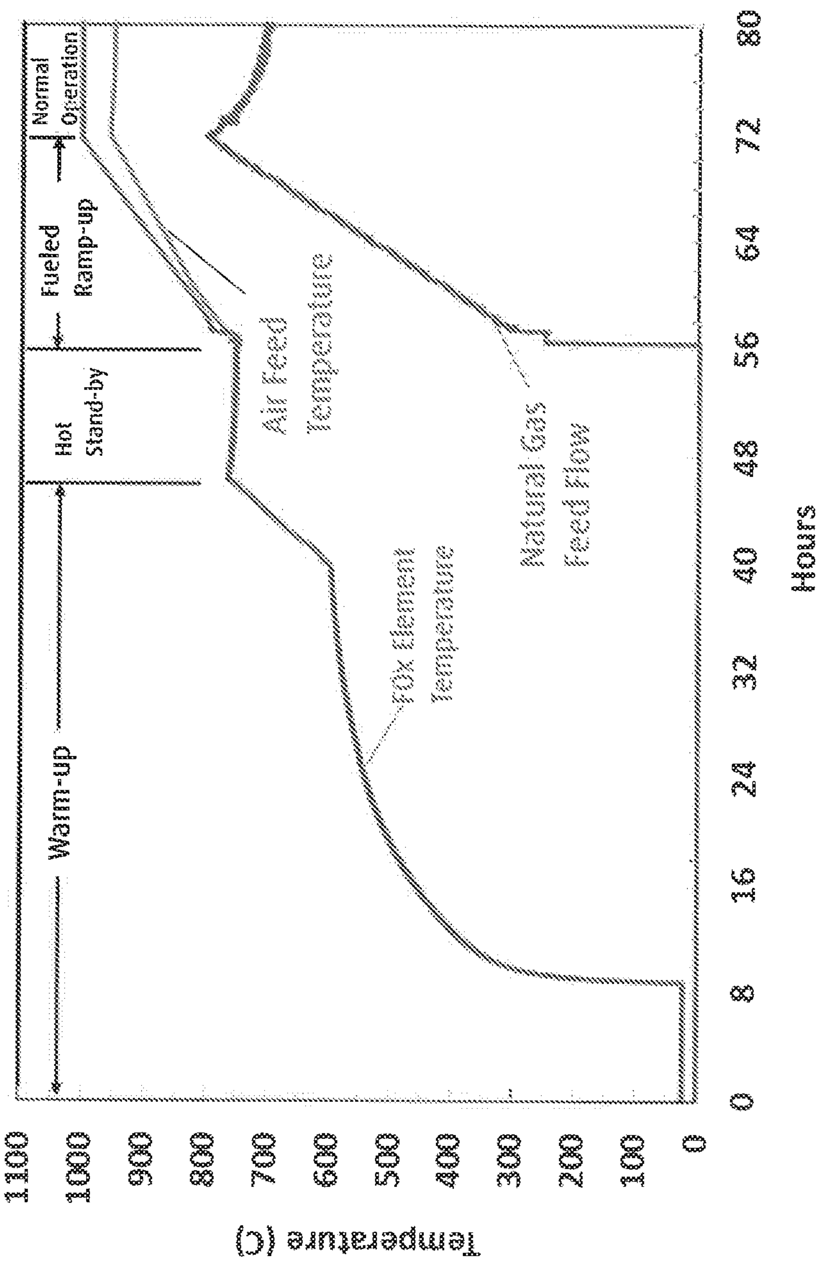
FIG. 6 a typical heat-up and fueled start-up sequence for a ceramic membrane flameless oxidizer heated steam methane reformer process.

FIG. 6 depicts a typical heat-up and fueled start-up sequence for a ceramic membrane flameless oxidizer heated steam methane reformer process with devices and streams defined in FIG. 2, The typical heat-up and fueled start-up process for the subject invention, 200, proceeds through several phases: A burner-heated warm-up to a threshold temperature followed by an arbitrary duration stand-by at threshold temperature, followed by a main process fueled ramp-up in temperature to a normal operation temperature and operating state. The burner-heated warm up is initiated by the energizing of the main motors serving one or more blowers, 202, 209, that circulate the airflow through the air-side of the process and reformer furnace enclosure. Once proof-of-airflow is confirmed, the ignition of one or more auxiliary burners, 205, may commence, generally following a prescribed burner management controller system sequence. Once an active and stable combustion process is established and confirmed, the system proceeds through a warm-up phase where the hot gas effluent from the burner is mixed with the cooler returning air from the furnace, and the hot mixture proceeds to an air preheater heat exchanger, 203. This heat exchanger is generally of a multi-pass tube and shell arrangement, utilizing 304SS and 800HT alloy tubes in the tube bundles as required by their operating temperature. The hot combustion gases are generally conveyed on the inside diameter of the tubes in the bundle, with the air being preheated on the outside (shell) side of the heat exchanger. For tubes with surfaces operating above about 500° C., an alumina barrier coating is applied to the outside surface of the tube, in a commercial aluminide cementation process as performed by DAL in the U.K. to reduce the Cr containing vapor species emission from the tubes into the feed air to the furnace containing the ceramic membrane flameless oxidizers. Filtered ambient air is provided to the shell side of the heat exchanger through action of typically an induced-draft blower, 209, at the exit of the process air system, or a combination of forced-draft blower, 202, at the inlet of the process, and an induced-draft blower, 209, at the outlet of the process. The incoming ambient air is preheated in the heat exchanger, 203, to a temperature typically 20-150° C. higher than the furnace exit air temperature by adjusting the firing duty of the auxiliary burner and the airflow rate as delivered by the blowers. The heating continues in this manner until a threshold temperature is reached, typically between 750-850° C. At this point, a stand-by, or dwell period of arbitrary duration may be conducted. A moderate duration dwell period, or 'soak' at this temperature serves to create a more uniform temperature environment in the reformer furnace before a process-fueled ramp-up phase is initiated. The process-fueled ramp-up phase is initiated when process steam is available at pressure in the steam drum and the initial low flow of natural gas and steam, 211, mixed-feed is supplied to the steam methane reformer tubes, 212. During this phase, the PSA tail gas fuel, 217, will begin to emerge from the PSA, 215, in increasing rates consistent with the mixed-feed flow rates to the steam-methane reformers. The PSA tail gas provides a fuel gas to the ceramic membrane flameless oxidizer elements, 204, promoting oxygen transport and oxy-combustion, and the associated heat release serving to drive additional heat to the reformer section. This process will occur with a progressive slow increase of reformer feed flow rate, associated PSA tail gas fuel flow to the ceramic membrane flameless oxidizing burners, and a corresponding increase in air temperature rise leaving the furnace. The auxiliary burner duty is adjusted during this period to allow for a coordinated heat up of the ceramic membrane and reformers to the target normal operating temperature of nominally 1000° C. for the ceramic membrane elements. Once normal operation temperature is achieved, then mixed-feed flow rate to the reformers and auxiliary burner duty are both modulated independently to maintain ceramic operating temperature within the desired range and maintain reformer production rates and metal temperature below prescribed operating limits. During this period, a supplemental flow of natural gas may be provided to the ceramic membrane elements to adjust their heat duty up to maintain temperature control. Alternatively, or in conjunction with the natural gas a small stream of recycled product hydrogen may be used to supply additional fuel to the ceramic membrane elements. During the normal operating period, the predominant CO2 emission from the plant is through the flue emissions, 207, from the natural gas fired auxiliary, burner, 205. These emissions can be offset and reduced to substantially zero by replacing some, or all, of the fuel energy supplied to the burner by natural gas with recycled product hydrogen.

Figure 7:
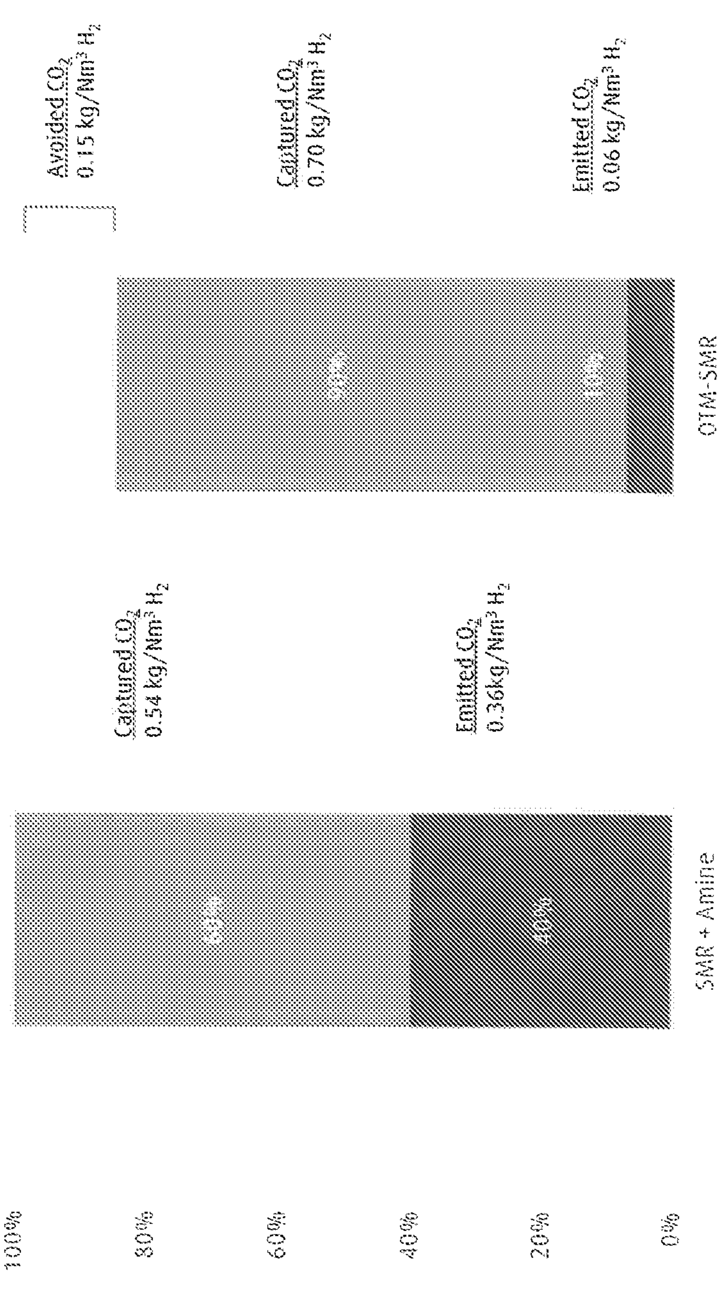
FIG. 7 is a schematic illustration of a comparison between the CO2 emission of the present invention and a conventional hydrogen production process utilizing steam methane reforming in conjunction with an amine-based system for carbon dioxide capture.

FIG. 7 is a schematic illustration of a comparison between the CO2 emission of the present invention and a conventional hydrogen production process utilizing steam methane reforming in conjunction with an amine-based system for carbon dioxide capture. Overall the method utilizing oxygen transport ceramic membranes, flameless oxidizer in an oxy-combustion mode to provide heat to the steam methane reformer avoids the need for an amine-based capture system and further avoids a majority of the CO2 emissions, and trace nitrogen-oxide emissions created by the air-blown combustion of a steam methane reformer furnace. The overall rate of CO2 capture with the ceramic membrane configuration is 30% higher per unit of hydrogen product than the steam methane reformer configuration with an amine-based capture system. The emitted CO2 of the ceramic membrane configuration is 17% of the steam methane reformer configuration with an amine-based capture system per unit of hydrogen product.

While the present invention has been characterized in various ways and described in relation to preferred embodiments, as will occur to those skilled in the art, numerous, additions, changes and modifications thereto can be made without departing from the spirit and scope of the present invention as set forth in the appended claims,

What is claimed is:

1. A method for decarbonizing a hydrogen production process that utilizes a steam methane reformer; wherein a feedstock comprising natural gas is fed to said reformer, wherein said natural gas is converted into a syngas which is further processed to produce a hydrogen product and a tail gas fuel stream, and wherein a portion of the tail gas fuel stream is combusted in one or more oxygen transport membrane reactors producing reaction heat and a combustion product stream, wherein a portion of the heat required to sustain an endothermic reforming reaction in said reformer is provided by said reaction heat via radiant heat transfer, followed by processing the combustion product stream exiting the oxygen transport membrane reactor to produce a concentrated CO2 stream containing from about 90% CO2 by volume to about 95% CO2 by volume.

2. The method of claim 1 wherein a CO2 product of at least 99.5% CO2 by volume is produced from the concentrated CO2 stream by a cryogenic liquefaction process.

3. The method of claim 2 whereby the non-condensable gases rejected from the cryogenic process are recycled back to the feed of the reformer system.

4. The method of claim 1 wherein the concentrated CO2 stream is further processed in a PSA process or a TSA process to produce a higher purity CO2 stream for compression and carbon sequestration or use as a feedstock to a downstream process.

5. The method of claim 4 where the concentrated CO2 stream is subsequently utilized as part of the feed of a dry-reforming process, a methanol synthesis process, or a Fisher-Tropsch synthesis process or a cement-curing process or a cement production process.

6. The method of claim 1 where the concentrated CO2 stream is subsequently utilized as part of the feed of a dry-reforming process.

7. The method of claim 1 wherein said concentrated CO2 stream is subjected to catalytic oxidation with a supplemental oxygen containing stream to produce a super-critical CO2 product comprising at least 99% CO2 by volume.

8. The method of claim 1 wherein said concentrated CO2 stream is subjected to methanation process to produce a moderate purity super-critical CO2 product containing CO2 in a concentration of about at least 95% CO2 by volume, CO in a concentration of less than about 1000 ppm by volume, and total hydrocarbons in a concentration less than about 5% by volume.

9. The method of claim 1, wherein the tail gas is compressed, mixed with superheated steam and subjected to a water-gas shift reaction to provide a fuel stream containing less than about 8% by volume CO for the oxygen transport membrane reactor.

10. The method of claim 1, wherein the tail gas is compressed, mixed with superheated steam and subjected to a methanation reaction to provide a fuel stream containing less than about 8% by volume CO for the oxygen transport membrane reactor.

11. The method of claim 1, wherein tail gas is compressed, mixed with superheated steam and subjected to a water-gas shift reaction or methanation reaction to provide a fuel stream for the oxygen transport membrane reactor wherein the fuel stream chemical equilibrium carbon activity calculated at a temperature of about 500° C. and a pressure of about 9 barg has a value less than about 10.

12. The method of claim 1, wherein the tail gas is compressed, mixed with superheated steam and subjected to a water-gas shift reaction or methanation reaction to provide a fuel stream for the oxygen transport membrane reactor wherein the fuel stream chemical equilibrium carbon activity calculated at a temperature of about 600° C. and a pressure of about 9 barg has a value less than about 5, preferably less than about 2.

* * * * *